Patented Sept. 16, 1941

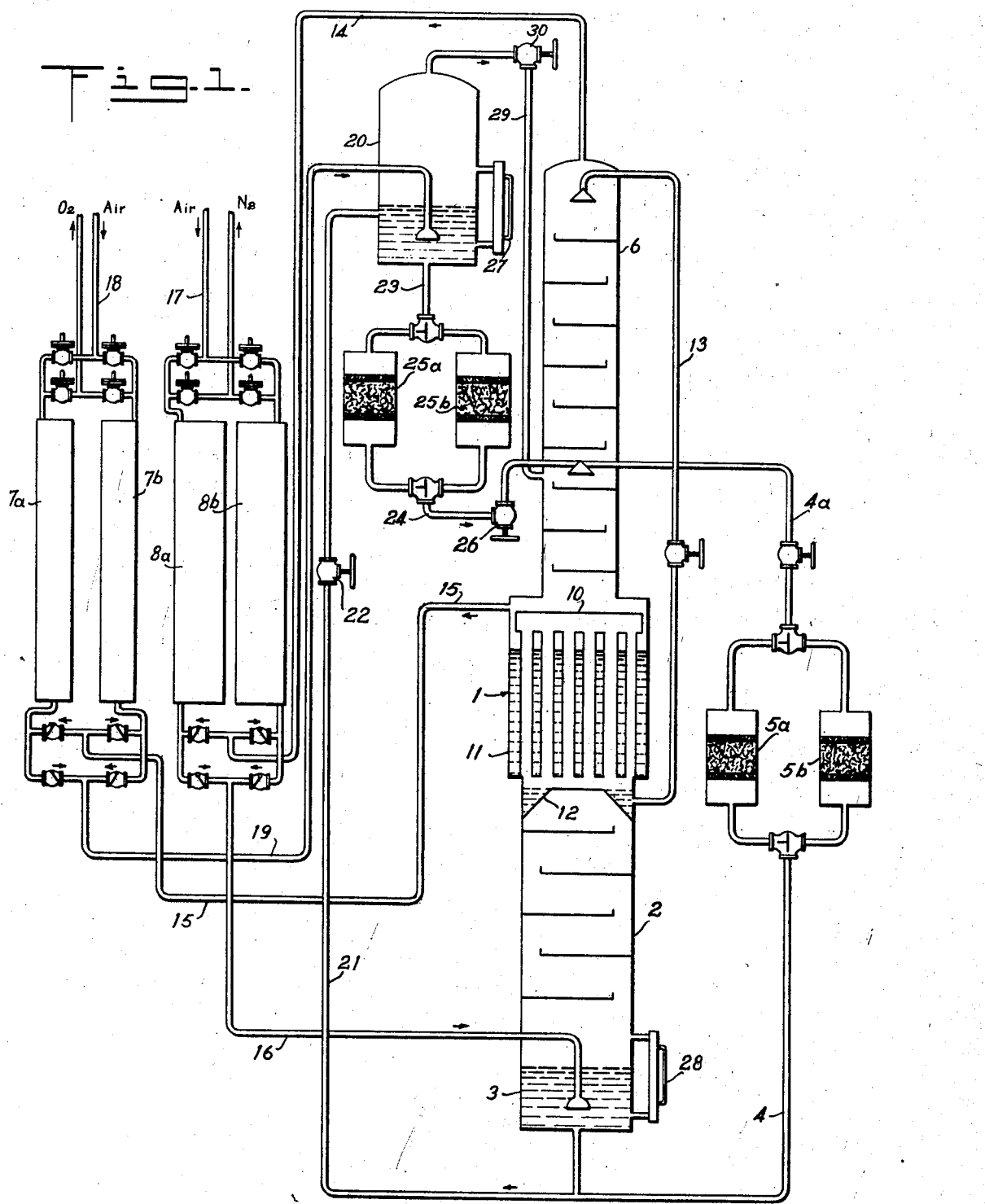

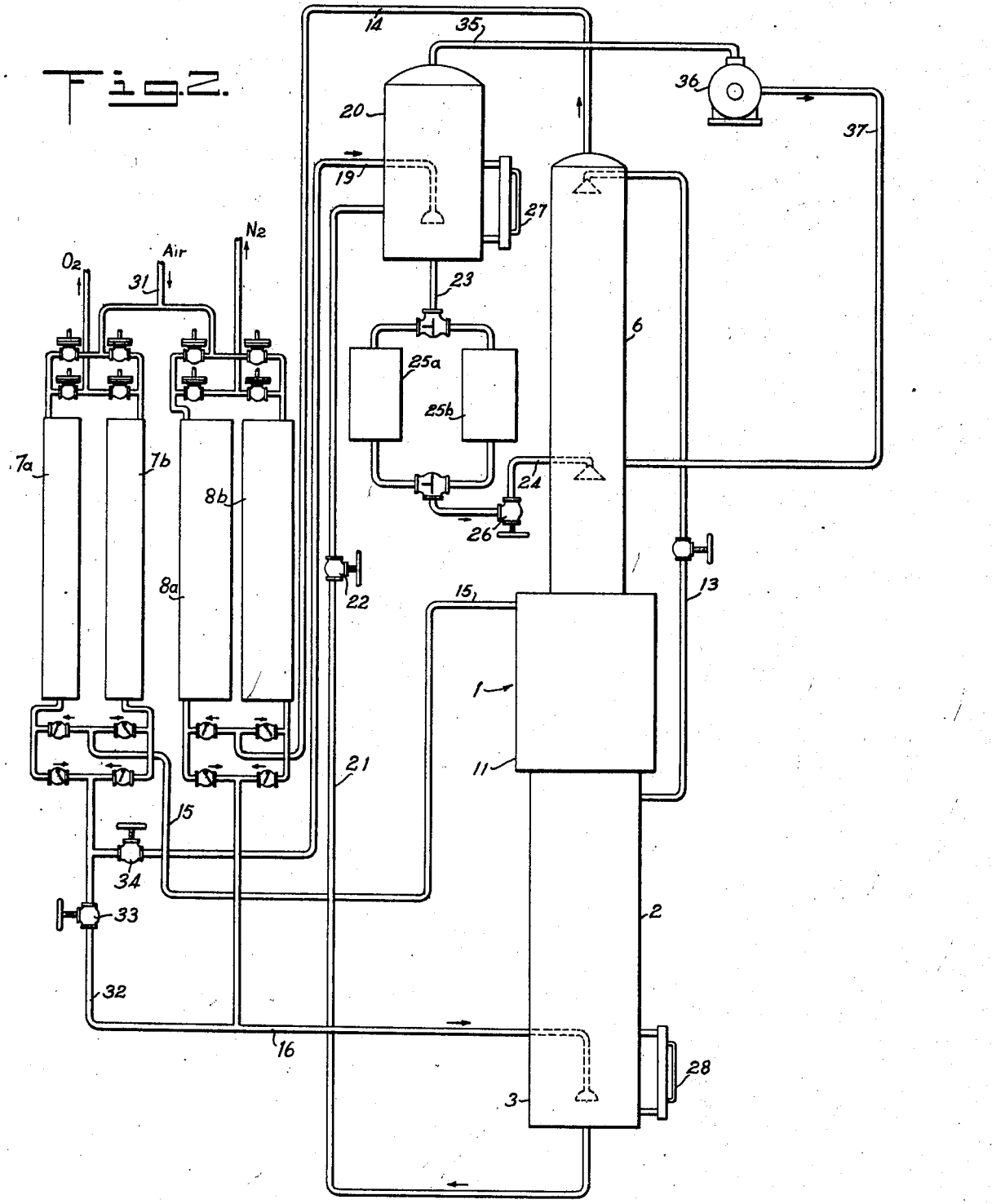

2,256,421

UNITED STATES PATENT OFFICE 2,256,421

PROCESS FOR THE SEPARATION OF AIR BY LIQUEFACTION AND RECTIFICATION

Philipp Borchardt, Solln, near Munich, Germany, assignor to Gesellschaft für Linde's Eismaschinen A. G., Hoellriegelskreuth, near Munich, Germany Application June 23, 1938, Serial No. 215,472
In Germany February 23, 1935

6 Claims. (Cl. 62—175.5)

This invention relates to a process and apparatus for separating gases by cooling to low temperatures, especially for the separation of air by liquefaction and rectification. It has been proposed for the separation of air by liquefaction and rectification to cool the air and reheat the products of separation in periodically reversed cold accumulators or regenerators. During the cooling of the air in the cold accumulators the carbon dioxide vapors are condensed in solid form, and after the reversal of the regenerators, they are evaporated and removed by the products of separation flowing in the opposite direction. It has been discovered, however, that although the air is cooled in the regenerators in the average to a temperature close to its dew point or liquefaction temperature at which temperature the carbon dioxide should be practically completely condensed and deposited in the regenerators, it happens very often that large quantities of carbon dioxide collect quite unexpectedly in the separating apparatus and there cause the known disturbances such as the clogging of rectifying trays, condenser tubes and expansion valves.

It is one object of the present invention to provide a process which avoids the difficulties caused by carbon dioxide remaining in the gas mixture to be separated after it has been cooled in cold accumulators. For this purpose the gas coming from the regenerators is passed through a suitable separator prior to its entering the rectification columns.

Another object of this invention is to eliminate solid carbon dioxide and similar impurities by passing the gas coming from the cold accumulators through a body of liquid comprising components of the gas mixture prior to its entering the rectification columns and separate from the liquid the solid carbon dioxide collected therein.

It is still another object of this invention to provide a process for removing solid carbon dioxide carried by cold air which is passed directly into the second stage of a two stage air rectifying apparatus.

These and other objects of this invention and the novel features thereof which achieve these objects, will become evident in the following detailed description having reference to the accompanying drawings in which:

Fig. I is a diagrammatic view of an arrangement of apparatus embodying the principles and illustrating the process of this invention applied to the separation of air, and Fig. II is a diagrammatic view of an alternative arrangement of apparatus for practicing the process of the present invention.

In the accompanying drawings a two-stage air separating apparatus of usual construction is shown generally at 1. The rectifying apparatus comprises a first stage or lower column 2 having a liquid collecting chamber or sump 3, adjacent its bottom end, a condenser 10 whose tubes are in communication with the upper end of the lower column, an oxygen collecting chamber 11 surrounding the condenser and a second stage or upper column 6 having its lower end in communication with the chamber 11. Part of the liquid rich in nitrogen which is produced by condensation of gas that rises into the condenser 10 from the lower column, collects on an annular shelf 12 from which it is conducted by a nitrogen transfer conduit 13 controlled by an expansion valve, to the upper end of the upper column. The liquid introduced by conduit 13 forms a reflux liquid for the upper portion of the second stage column. The nitrogen enriched product of separation flows from the top of the upper column through conduit 14 to the lower end of either one of the nitrogen regenerators 8a or 8b. The oxygen product of separation produced by boiling of the liquid in chamber 11 flows through conduit 15 to the lower end of either of the oxygen regenerators 7a or 7b.

The air to be treated is cooled down to its dew point in heat exchange with the products of separation in the regenerators 7a, 8a, or 7b, 8b resp. Though at the dew point temperature of the air, carbon dioxide should be practically completely condensed, it is often found present in the rectification columns in detrimental amounts. This may be caused by the fact that the regenerator near the end of that period during which air is cooled, is somewhat warmed at its cold end so that a complete condensation of carbon dioxide may not take place in that time. This difficulty may be overcome by passing a larger volume of cold products of separation through the regenerators than of air to be cooled in order to keep the temperatures at the cold end of the regenerators continually as low as possible. But this method does not prevent the entrainment by the air current of carbon dioxide condensed in the form of finely divided frost or snow particles.

It has been found that the carbon dioxide may be completely removed from the air by making it pass suddenly through a liquid, namely liquid air or liquid oxygen. In this liquid the carbon dioxide collects in flaky form so that it may be easily removed, e. g. by filtration.

The air however should not be cooled to such a degree that partial liquefaction occurs before the air is conducted into the body of liquid because the liquid air that forms will wet the surfaces of the passages from the lower ends of the regenerators and cause some of the finely divided particles of solid carbon dioxide to adhere to the wetted surfaces so that clogging of the passages may occur. The air therefore must be cooled to a temperature sufficiently low so that substantially all the $CO_2$ is reduced to solid form but not below the condensation temperature of the gases to be separated. The particles of solid carbon dioxide, which are not retained in the regenerators at a place where they can be sublimed and removed, but which are entrained in the gas, are thus kept in a dry state until suddenly brought into contact with an excess of liquid. This sudden and thorough contact with liquid, effected by passing the gas into the body of liquid air, causes the fine particles of solid to coalesce and form larger flaky particles that can be filtered from the liquid.

For the air which is introduced under pressure into the first stage of rectification 2, through conduit 16 leading from the cold end of regenerators 8a and 8b it is not necessary to provide a separate device for bringing the air into contact with a liquid, but the liquid at the bottom of column 2 may be used for this purpose. The air is introduced into the column 2 in such a way that the admission pipe dips below the liquid level in the sump 3 so that the air is forced to flow through this body of liquid. In order to remove the solid carbon dioxide contained in the liquid the same is filtered in the filters 5a and 5b in the known manner before transfer into the upper column. The filters are alternately used; one of them is used for purifying the oxygen containing liquid flowing from sump 3 to column 6 through pipes 4 and 4a while the other one is being cleaned from the retained solid carbon dioxide, e. g. by rinsing with liquid oxygen forced through in the opposite direction. It is thus possible to prevent disturbances in the separating apparatus caused by an imperfect separation of carbon dioxide in the cold exchangers and to obtain working periods of many months without any interruption.

In case air is blown in gaseous state into the second stage of rectification the difficulties caused by the incomplete separation of carbon dioxide in the regenerators may be overcome in a somewhat different way. The precooled air is passed through a bubbler device containing liquid air or liquid oxygen, and carbon dioxide separated therein is removed from the liquid in any suitable way, e. g. by filtration. For this purpose it is an essential feature to bring the cold air in contact with liquid prior to its rectification. Referring again to Fig. 1, the air which is to be introduced into the lower column is preferably conducted through the nitrogen regenerators 8a and 8b only and is supplied under substantial pressure thru conduit 17. Additional air which is to be introduced into the upper column need not be compressed to so high a pressure and is preferably cooled in separate regenerators. Thus the portion of air to be added to the upper column compressed to 0.9 atmosphere gage, for example, is conducted through conduit 18 to the warm ends of oxygen regenerators 7a or 7b. From the oxygen regenerators the air is conducted through conduit 19 to a separate bubbler chamber 20 wherein the air is introduced below the liquid level of a body of liquid rich in oxygen that is maintained in the bubbler.

The liquid body in bubbler chamber 20 is continually renewed by drawing liquid from the sump 3 through conduit 21 which conducts it to the chamber 20. The pipe 21 is controlled by an expansion valve 22 which reduces the pressure of the liquid from that of the lower column to that of the bubbler chamber which may be about 0.8 atmosphere. The excess liquid containing carbon dioxide is discharged through conduits 23 and 24 into the upper column at an intermediate point after passing through one of the filters 25a or 25b which may be substantially identical to the filters 5a and 5b. A valve 26 is preferably provided in conduit 24 to control the rate of flow of the liquid into the upper column so that the liquid in the bubbler 20 may be maintained at the desired level. The flow of liquid may occur due to the head of gravity but preferably is insured by providing a small differential of pressure between the bubbler chamber and the upper column. For example the upper column may operate at about 0.5 atmosphere. The air after having been washed in the bubbler 20 is conducted therefrom by conduit 29 directly into the upper column at a suitable point near the liquid inlet. Conduit 29 is controlled by a valve 30 which may be used to regulate the flow of air so that the desired pressure in bubbler 20 is maintained. A liquid level gauge 27 may be provided to indicate the level of liquid in the bubbler. A similar liquid level gauge 28 of a kind customarily employed shows the level of the liquid in the sump 3, the valve 22 being regulated to control the level. If desired all the liquid produced in the lower column may be conducted to the bubbler 20. In this event flow through the conduits 4 and 4a is completely stopped by turning the three way valve below filters 5a and 5b a quarter turn clockwise.

Referring to Fig. II there is shown a slightly different arrangement of the apparatus in which like parts are designated by the same numerals as in Fig. I. Here, however, both air streams are compressed to a higher pressure and may for example be compressed to the same pressure and conducted by conduit 31 to both sets of regenerators. In order to have positive control of the proportion of air which is to pass to the lower column compared to that which is to pass to the upper column, a by-pass connection 32 is provided between conduit 19 and conduit 16. The by-pass is controlled by a valve 33 while a valve 34 is provided to control conduit 19. With valve 33 closed the full amount of air cooled in the oxygen regenerators may be passed to the upper column and by opening valve 33 slightly and closing valve 34 a desired amount, the amount of air passing to the upper column may be reduced to that desired for regulating the operation of the column.

In this form of the apparatus the bubbler 20 is operated under a pressure that may be not much lower than the pressure in the lower column. The valve 22 therefore acts merely to control the flow of liquid from the sump 3 so as to maintain the liquid level therein constant. The valve 26 acts as the liquid transfer expansion valve.

The air which is washed under pressure in bubbler 20, is conducted by pipe 35 to the inlet of an expansion turbine 36 in which it is expanded with the production of external work to the pressure of the upper column. From the turbine 36 the air is conducted into the upper column at a desired intermediate point by pipe 37. Due to the expansion with external work the air is further refrigerated, the refrigeration produced being usefully applied in known manner.

The process as hereinbefore described may be applied in the same way for separating the last residues of substances condensable in solid form such as carbon dioxide or acetylene in the separation of other gas mixtures by cooling to low temperature.

This application is a continuation-in-part of my copending application Serial No. 62,206 filed February 3, 1936.

I claim:

1. A process for the separation of mixtures of gases having relatively low boiling points and containing also relatively small amounts of carbon dioxide, by liquefaction and rectification which comprises cooling said mixture to a temperature substantially below the freezing point temperature of carbon dioxide but not below the condensation temperature of the gases to be separated by effecting cold exchange between the mixture and a cold regenerative body and between said body and cold separated components of the mixture by alternately reversing the flow of the mixture and of said components through each of a plurality of regenerators whereby small amounts of the carbon dioxide in a finely divided solid state pass out of said regenerators in suspension in the cooled mixture; introducing the cooled mixture wholly in gaseous form and carrying the finely divided carbon dioxide directly below the surface of and within a body of liquid containing the components of said mixture whereby the solid carbon dioxide is entrained in said body of liquid and removed from the cold gaseous mixture; separating from said liquid the carbon dioxide thus entrained therein; and concurrently rectifying the respective carbon dioxide-free gaseous mixture and the carbon dioxide-free liquid at low temperature to produce said cold separated components.

2. A process for the separation of air containing relatively small amounts of carbon dioxide by liquefaction and rectification which comprises cooling the air to a temperature substantially below the freezing point temperature of carbon dioxide but not below the condensation temperature of oxygen by effecting cold exchange between the air and a cold regenerative body and between said body and cold separated components of the air by alternately reversing the flow of the air and of said components through each of a plurality of regenerators whereby small amounts of the carbon dioxide in a finely divided solid state pass out of said regenerators in suspension in the cooled air; introducing the cooled air wholly in gaseous form and carrying the finely divided carbon dioxide directly below the surface of and within a body of liquid containing oxygen and nitrogen whereby the solid carbon dioxide is entrained in said body of liquid and removed from the cold gaseous air; separating from said liquid the carbon dioxide thus entrained therein; and concurrently rectifying the respective carbon dioxide-free air and the carbon dioxide-free liquid at low temperature to produce said cold separated components.

3. In a process for the separation of air by liquefaction and rectification wherein air is compressed, cooled by heat exchange with separated products, partially liquefied under pressure, and subjected to rectification in two stages at successively lower pressures, the higher boiling point product of the first-stage rectification being subjected to rectification in the second stage with a liquefied portion of the lower boiling point product, the steps which comprise cooling the compressed air containing small amounts of carbon dioxide to a temperature substantially below the freezing point of carbon dioxide but not below the condensation temperature of oxygen by effecting cold exchange between such air and a cold regenerative body and between said body and a cold product of the rectification by alternately reversing the flow of the air and of said product through each of a plurality of regenerators whereby small amounts of carbon dioxide in a finely divided state pass out of said regenerators in suspension in the cooled air; introducing the cooled air wholly in gaseous form and carrying the finely divided solid directly below the surface of and within a body of liquid containing oxygen whereby the solid carbon dioxide is entrained in said body of liquid and removed from the cooled air; subjecting the carbon dioxide-free air to partial liquefaction and rectification in said first stage to produce said liquid rich in oxygen and a partially liquefied product rich in nitrogen; continually withdrawing a portion of liquid; separating solid carbon dioxide from the liquid withdrawn; and rectifying the carbon dioxide-free liquid in the second stage together with the nitrogen enriched liquid product of the first-stage rectification.

4. A process for the separation of air by liquefaction and rectification in two stages which comprises rectifying a portion of cooled air in the first stage to produce a liquid enriched in oxygen and a product enriched in nitrogen; providing a separate body of liquid containing oxygen; passing another portion of cold air cooled to about its condensation temperature and wholly in gaseous form containing suspended therein finely divided carbon dioxide directly within and below the surface of said body of liquid thereby entraining the solid carbon dioxide in said liquid; passing the carbon dioxide free air into said second stage to be rectified with the nitrogen enriched product of the first stage rectification and continuously renewing said body of liquid by transferring thereto portions of liquid from said first stage and discharging portions of liquid therefrom; separating solid carbon dioxide from the portions of liquid discharged; and passing the carbon dioxide free liquid portions into said second stage to be rectified.

5. A process for the separation of air by liquefaction and rectification in two stages which comprises rectifying a portion of cooled and compressed air in the first stage to produce a liquid enriched in oxygen and a product enriched in nitrogen; providing a separate body of liquid containing oxygen maintained under a pressure intermediate between the pressures of said first and second stages; passing another portion of compressed air cooled to about its condensation temperature and wholly in gaseous form containing suspended therein finely divided carbon dioxide directly within and below the surface of said body of liquid thereby entraining the solid carbon dioxide in said liquid; expanding the carbon dioxide free air with the production of external work, thereby further cooling said air; passing said expanded air into said second stage to be rectified with the nitrogen enriched product of the first stage rectification and continuously renewing said body of liquid by transferring thereto portions of liquid from said first stage and discharging portions of liquid therefrom; separating solid carbon dioxide from the portions of liquid discharged; and expanding the carbon dioxide free liquid portions into said second stage to be rectified.

6. A process for the separation of air by liquefaction and rectification in two stages at successively lower pressures which comprises cooling the air containing small amounts of carbon dioxide to a temperature substantially below the freezing point of carbon dioxide but not below the condensation temperature of oxygen whereby small amounts of finely divided solid carbon dioxide are carried in suspension in the cold air; introducing a portion of such cooled air directly below the surface of and within a body of liquid containing oxygen in the first stage of rectification thereby entraining the solid carbon dioxide in said body of liquid; rectifying the carbon dioxide-free portion of air in said first stage to produce said liquid rich in oxygen and a partially liquefied product rich in nitrogen; providing a separate second body of liquid containing oxygen; introducing a second portion of such cooled air directly below the surface of and within said second body of liquid thereby entraining the solid carbon dioxide carried by said second portion of air in said second body of liquid; passing the carbon dioxide-free second portion of air into the second stage; transferring portions of liquid from said first body to said second body of liquid; continually discharging portions of liquid from said second body of liquid; separating solid carbon dioxide from the liquid discharged; and passing said discharged liquid portions into the second stage to be rectified together with said second portion of air and the nitrogen enriched product of the first stage.

PHILIPP BORCHARDT.